(12) United States Patent
Nishimura et al.

(10) Patent No.: US 6,408,876 B1
(45) Date of Patent: Jun. 25, 2002

(54) CONTROL VALVE

(75) Inventors: Yoshizumi Nishimura, Tsuchiura; Yusaku Nozawa, Ibaraki-gun; Kinya Takahashi, Tsuchiura; Mitsuhisa Tougasaki, Niihari-gun, all of (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 09/601,251

(22) PCT Filed: Nov. 30, 1999

(86) PCT No.: PCT/JP99/06695

§ 371 (c)(1),
(2), (4) Date: Oct. 13, 2000

(87) PCT Pub. No.: WO00/32970

PCT Pub. Date: Jun. 8, 2000

(30) Foreign Application Priority Data

Dec. 1, 1998 (JP) .......................... 10-341890

(51) Int. Cl.[7] .............................................. F16K 11/24
(52) U.S. Cl. ............................ 137/596.15; 137/596.14; 60/427; 60/445
(58) Field of Search .................. 137/596.15, 596.14; 60/427, 452, 445

(56) References Cited

U.S. PATENT DOCUMENTS

| 4,089,169 | A | * | 5/1978 | Miller | 60/445 |
|---|---|---|---|---|---|
| 4,706,930 | A | * | 11/1987 | Lexen | 137/596.16 X |
| 4,763,473 | A | * | 8/1988 | Ziplies et al. | 60/431 |
| 4,966,196 | A | * | 10/1990 | Meyer | 137/625.64 |
| 5,315,829 | A | * | 5/1994 | Fischer | 60/456 |
| 5,528,911 | A | * | 6/1996 | Roth et al. | 60/452 |
| 5,907,951 | A | * | 6/1999 | Toyooka et al. | 60/445 |
| 5,983,921 | A | * | 11/1999 | Miyazoe et al. | 137/596.16 X |
| 5,992,147 | A | * | 11/1999 | Tajima | 60/445 |
| 5,996,609 | A | * | 12/1999 | Akimoto et al. | 137/625.64 X |

* cited by examiner

Primary Examiner—John Rivell
Assistant Examiner—Meredith H. Schoenfeld
(74) Attorney, Agent, or Firm—Crowell & Moring LLP

(57) ABSTRACT

It is an object of the present invention to provide a control valve which can reduce the number of external lines connected to a hydraulic remote control valve. A control valve 1 for controlling hydraulic cylinders 2,2' is provided, in one 26 of spool covers, with fluid passages 27,27', a shuttle valve 28 for selecting higher one of pilot pressures to be transmitted to these fluid passages 27,27', and a fluid passage 29 for transmitting the pressure selected by the shuttle valve 28. The fluid passages 27,27' are in communication with pressure fluid ports 25,25' as connection ports for pilot lines 24a,24c. The control valve 1 is also provided, in the other spool cover 32, with fluid passages 33,33', a shuttle valve 34 for selecting higher one of pilot pressures to be transmitted to these fluid passages 33,33', and a fluid passage 35 for transmitting the pressure selected by the shuttle valve 34. The fluid passages 33,33' are in communication with pressure fluid ports 31,31' as connection ports for pilot lines 24b,24d.

6 Claims, 5 Drawing Sheets

CONTROL VALVE

DESCRIPTION

1. Technical Field

The present invention relates to a control valve, which is arranged in a hydraulic system to be arranged in a construction machine or the like and is operable responsive to a pilot pressure to control a flow of pressure fluid to be supplied to an actuator.

2. Background Art

Hydraulic apparatuses, for example, construction machines and the like often make use of a system that a flow rate of working fluid is controlled by a control valve operable responsive to a pilot pressure and the pilot pressure is outputted, as is, as a control pressure to control a pressure and flow rate of pressure fluid to be delivered from a hydraulic pump. In this instance, it is a common practice to control plural spools, which are arranged in association with a single hydraulic pump and are housed within the control valve, to effect distribution of a flow rate. Adopted here is a system that the highest one of pilot pressures for actuating the plural spools, respectively, is transmitted to a delivery control device for the hydraulic pump by way of a shuttle valve or the like. It is generally a hydraulic remote control valve that controls the plural pilot pressures, and as is shown in JP 3-59502, the shuttle valve which selects the highest one of the pilot pressures is generally arranged as an integral element inside the hydraulic remote control valve.

FIG. 3 is a circuit diagram of a conventional technique of this sort, namely, of a hydraulic system including a conventional control valve.

The conventional technique shown in FIG. 3 is provided with a variable displacement hydraulic pump 61, a control valve 62 having spools 57,59 for controlling flows of hydraulic fluid delivered from the hydraulic pump 61 and supplied to unillustrated actuators such as hydraulic cylinders, and a hydraulic remote control valve 70 for producing pilot pressures for actuating the spools 57,59 in the control valve 62.

The hydraulic remote control valve 70 includes a control lever 50 for controlling the spool 57, a control lever 51 for controlling the spool 59, hydraulic pilot valves 50a,50b operable in association with pivotal control of the above-mentioned control lever 50, and hydraulic pilot valves 51a,51b operable in association with pivotal control of the above-mentioned control lever 51.

The pilot valve 50a and a pressure fluid port, which is in communication with one 57a of pressure fluid control compartments in the spool 57, are connected to each other through a pilot line 56a, while the pilot valve 50b and a pressure fluid port, which is in communication with the other pressure fluid control compartment 57b in the spool 57, are connected to each other through a pilot line 56b. Similarly, the pilot valve 51a and a pressure fluid port, which is in communication with one 59a of pressure fluid control compartments in the spool 59, are connected to each other through a pilot line 58a, while the pilot valve 51a and a pressure fluid port, which is in communication with the other pressure control compartment 59b in the spool 59, are connected to each other through a pilot line 58b. Of the above-mentioned pilot lines 56a,56b,58a,58b, portions exposed to the outside of the hydraulic remote control valve 70 make up external lines and are formed, for example, of pressure fluid hoses having flexibility.

Further, the above-mentioned hydraulic remote control valve 70 is of a construction that includes, as integral elements, a first shuttle valve 52 for selecting fluid on a side of higher pressure one of the pilot lines 56a,56b, a second shuttle valve 53 for selecting fluid on a side of higher pressure one of the pilot lines 58a,58b, and a third shuttle valve 54 for further outputting higher one of the pilot pressures outputted from the first and second shuttle valves 52,53, respectively.

In addition, the conventional hydraulic system is also provided with a line 60 for transmitting the pilot pressure, which has been outputted through the third shuttle valve 54, as a control pressure for the hydraulic pump 61. This line 60 is also in the form of an external line, and comprises a pressure fluid hose having flexibility.

The hydraulic remote control valve 70 is generally arranged on a left-hand or right-hand side of the driver's seat. According to the conventional art, there is a tendency that, as shown in FIG. 3, more pressure fluid hoses tend to be connected to the hydraulic remote control valve 70, so that a limitation tends to be imposed on a space for its arrangement. In other words, the arrangement and design tolerance of the hydraulic remote control valve 70 tends to become smaller. Incidentally, five external lines extend out as pressure fluid hoses in total in the embodiment illustrated in FIG. 3, including the four pilot lines from the hydraulic remote control valve 70 and the single line from the third shuttle valve 54.

As apparatuses making use of the hydraulic remote control valve 70 of this type, on the other hand, there are, for example, mini power shovels such as that disclosed in JP 8-137567. In mini power shovels of this type, control levers for operating a remote control valve are arranged movably in many instances in view of operator's convenience upon ingress to and egress from the operator's seat. An example of these mini power shovels is illustrated in FIG. 4.

As is shown in FIG. 4, the mini power shovel is provided with a travel base 101, which includes a pair of crawler treads, and a swivel superstructure 102 arranged on the travel base 101. On the swivel superstructure 102, an operator's seat 103 is disposed, and a canopy 104 is arranged above the operator's seat 103 such that a roof 104a covers the operator's seat 103. A swing post 105 is arranged on a front part of the swivel superstructure 102. A boom 106 is connected to the swing post 105. The boom 106 is turnable in a vertical direction, and is also turnable in a horizontal plane by way of the swing post 105.

Arranged in front of the operator's seat 103 are a left drive lever 107a and a right drive lever. The left drive lever 107a is used to operate an unillustrated left drive motor which serves to drive the left-hand crawler tread of the travel base 101, while the right drive lever is employed to operate an unillustrated right drive motor which serves to drive the right-hand crawler tread of the travel base 101. Arranged on a forward left-hand side of the driver's seat 103 is a left control device for operating, for example, unillustrated boom and bucket cylinders adapted to drive the boom 106 and an unillustrated bucket, respectively; namely, a left console 108 having a left control lever 108a. Arranged on a froward right-hand side of the operator's seat 103 is a right control device for operating, for example, unillustrated arm cylinder and swivel motor adapted to drive an unillustrated arm and the swivel superstructure 102, respectively; namely, a right console having a right control lever. In addition, a left gate lock lever 110a which makes up a jump lifter is arranged on the side of the left console 108, and a right gate lock lever which makes up another jump lifter is disposed on the side of the right console.

In the mini power shovel constructed as described above, an operator who has operated it in the operator's seat 103 turns the left gate lock lever 110a in a clockwise direction as viewed in FIG. 4 (to a position indicated by alternate long and short dash lines in the figure) when the operator wants to egress, for example, from the left side where the left console 108 is located. When the left gate lock lever 110a is caused to turn as mentioned above, the control lever 108a is also caused to jump up rearward so that a foot area, specifically the space on a forward left-hand area of the operator's seat 103 becomes wider, thereby facilitating an egress of the operator who has sat in the operator's seat 3.

Due to the above-mentioned tendency of arrangement of more pressure fluid hoses, however, such pressure fluid hoses still interfere with operator's stepping up or down even when the foot area has become wider. Further, due to an additional weight of such pressure fluid hoses, large operating force is indispensable upon operating the gate lock lever 110a. An improvement has hence been desired in operability. It has also been pointed out that due to heat from these pressure fluid hoses, the operator's seat tends to become hot, leading to a deterioration in the working environment of the operator.

These days, there is also a tendency that the dimensions of the hydraulic remote control valve 70 are limited small to assure a sufficient space around the operator's seat. Because more pressure fluid hoses are arranged as mentioned above, work which is required to connect these pressure fluid hoses to the hydraulic remote control valve 70 tends to become more irksome, resulting in a problem of an increased assembly manpower.

The present invention has been completed in view of the above-described problems of the prior art, and as an object thereof, has the provision of a control valve which can be constructed with external lines as few as needed essentially.

DISCLOSURE OF THE INVENTION

To achieve the above-described object, the present invention furnishes a control valve provided with a plurality of spools movably arranged within a valve body, movements of the spools being effected by pilot pressures, respectively, characterized in that a shuttle valve for selecting higher one of the pilot pressures, which cause the spools to move, respectively, is arranged within a main body of the control valve.

The main body of the control valve may comprise the valve body and spool covers, the value body of the control valve may be provided with a pump port which is connected to a variable displacement hydraulic pump, and an actuator port connected to an actuator. The spool covers may be arranged on an longitudinal extension of the spools and on opposite sides of the valve body, respectively, and the shuttle valve may be arranged on at least one of the spool covers.

One of the spool cover of the main body of the control valve may be provided with a line which is a first pressure fluid port connected to a delivery control device for the variable displacement hydraulic pump. Further, the spool covers may each be provided with two pressure fluid ports connected as second and third pressure fluid ports to a hydraulic remote control valve, and the shuttle valve may be arranged between the second and third pressure fluid ports. Here, the second and third pressure fluid ports may be arranged adjacent to each other.

In addition, a shuttle valve for transmitting a control pressure to the variable displacement hydraulic pump may be arranged within the main body of the control valve.

When constructed as described above, the spools are actuated by pilot pressures transmitted as a result of control of the hydraulic remote control valve, whereby drive of the actuator, said drive being governed by the actuation of the spools, is controlled. Further, higher one of the pilot pressures applied to the spools is outputted from the shuttle valve arranged within the control valve, and is transmitted as a control pressure for the delivery control device. Accordingly, lines directly associated with the actuation of the spools are only required as external lines connected to the hydraulic remote control valve, and as a line for transmitting the pilot pressure as a desired control pressure, one connecting the control valve with an equipment desired to be controlled is only required. This makes it possible to reduce to a minimum the number of external lines connected to the hydraulic remote control valve.

BEST MODES FOR CARRYING OUT THE INVENTION

The embodiment of the control valve according to the present invention will hereinafter be described based on the drawings.

Figure 1:
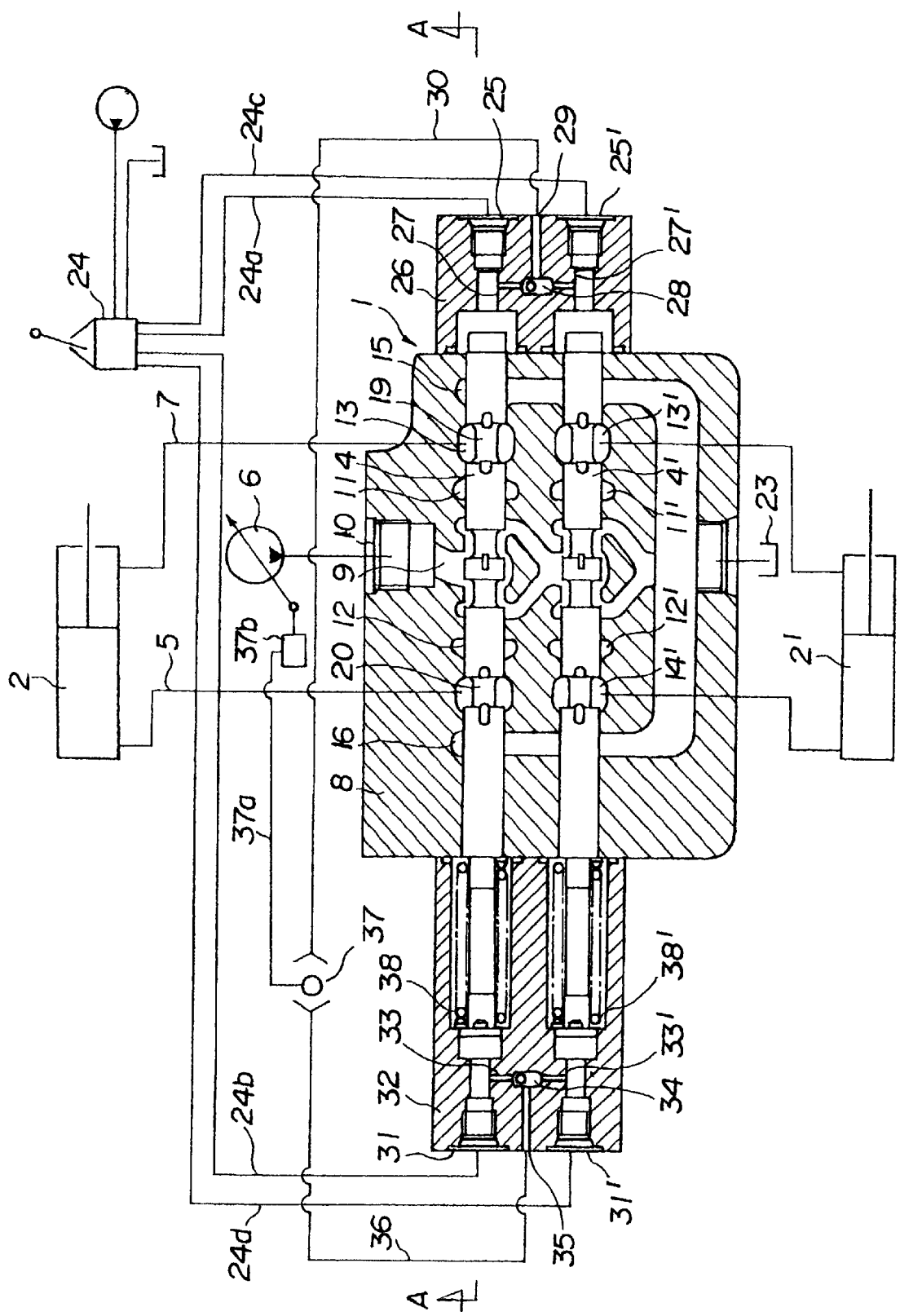
FIG. 1 is a circuit diagram showing a hydraulic system which includes an embodiment of the control valve according to the present invention.
Figure 2:
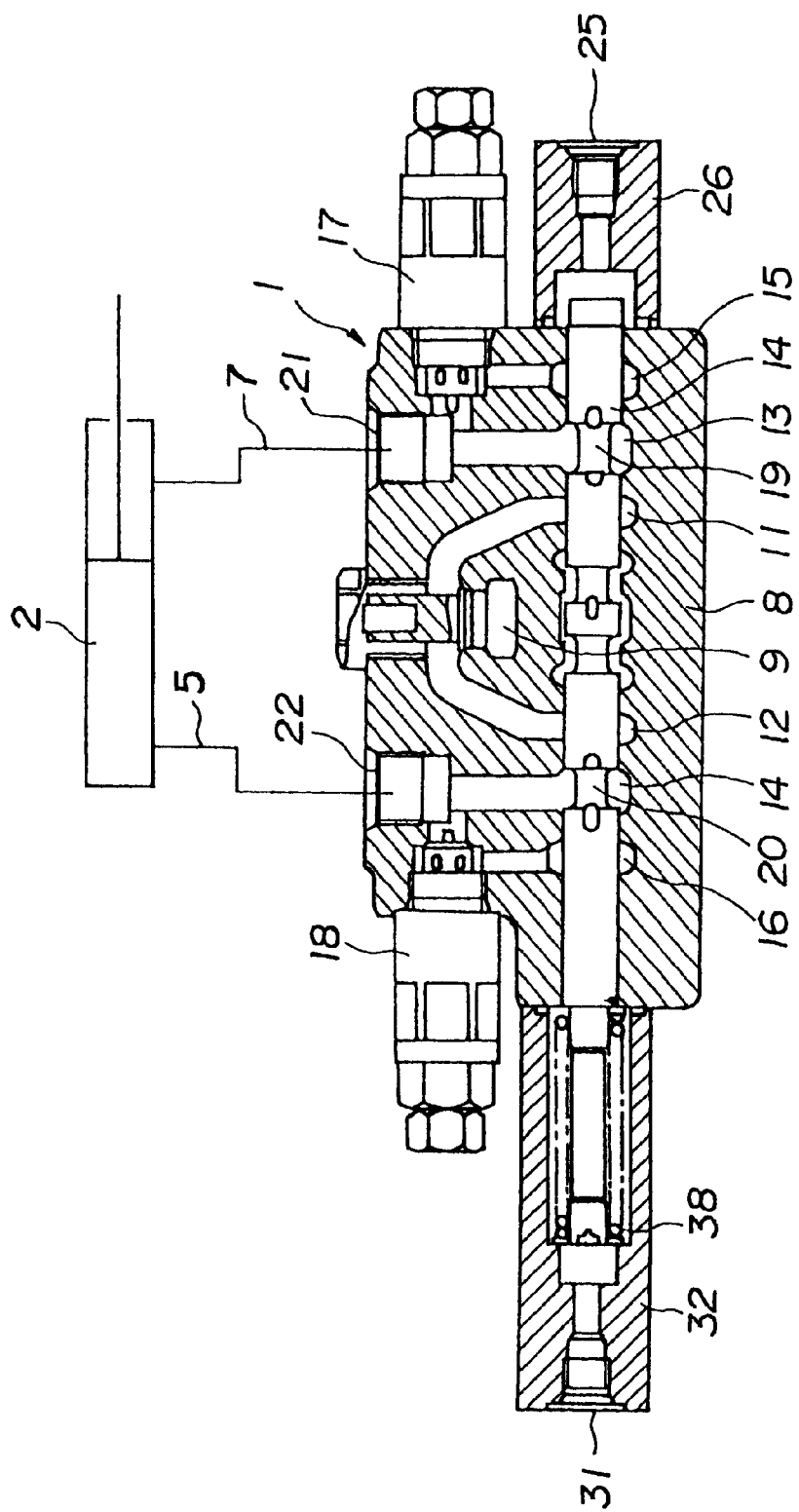
FIG. 2 is a cross-sectional view taken in the direction of arrows A—A of FIG. 1.
Figure 3:
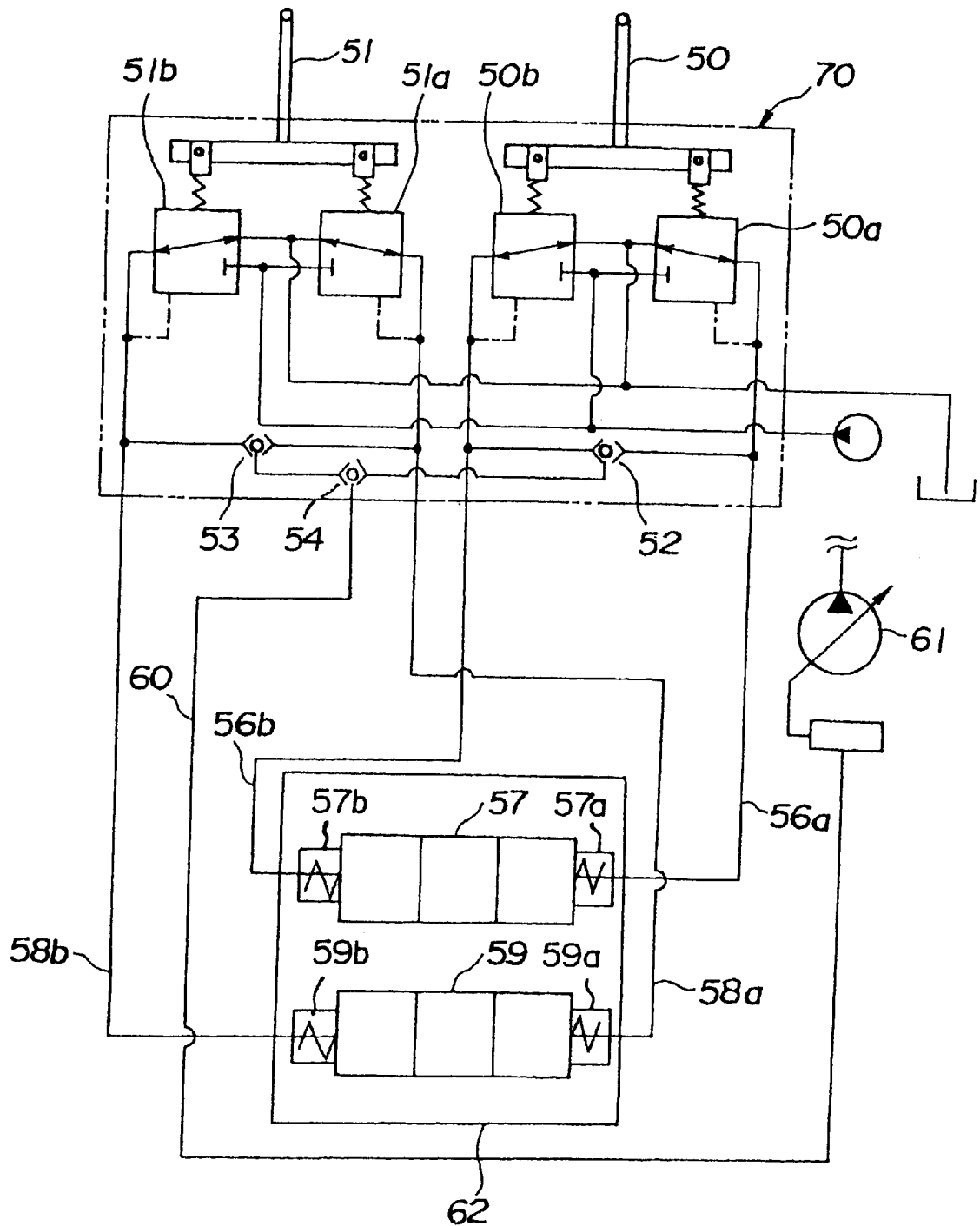
FIG. 3 is a circuit diagram illustrating a hydraulic system which includes a conventional hydraulic control valve.
Figure 4:
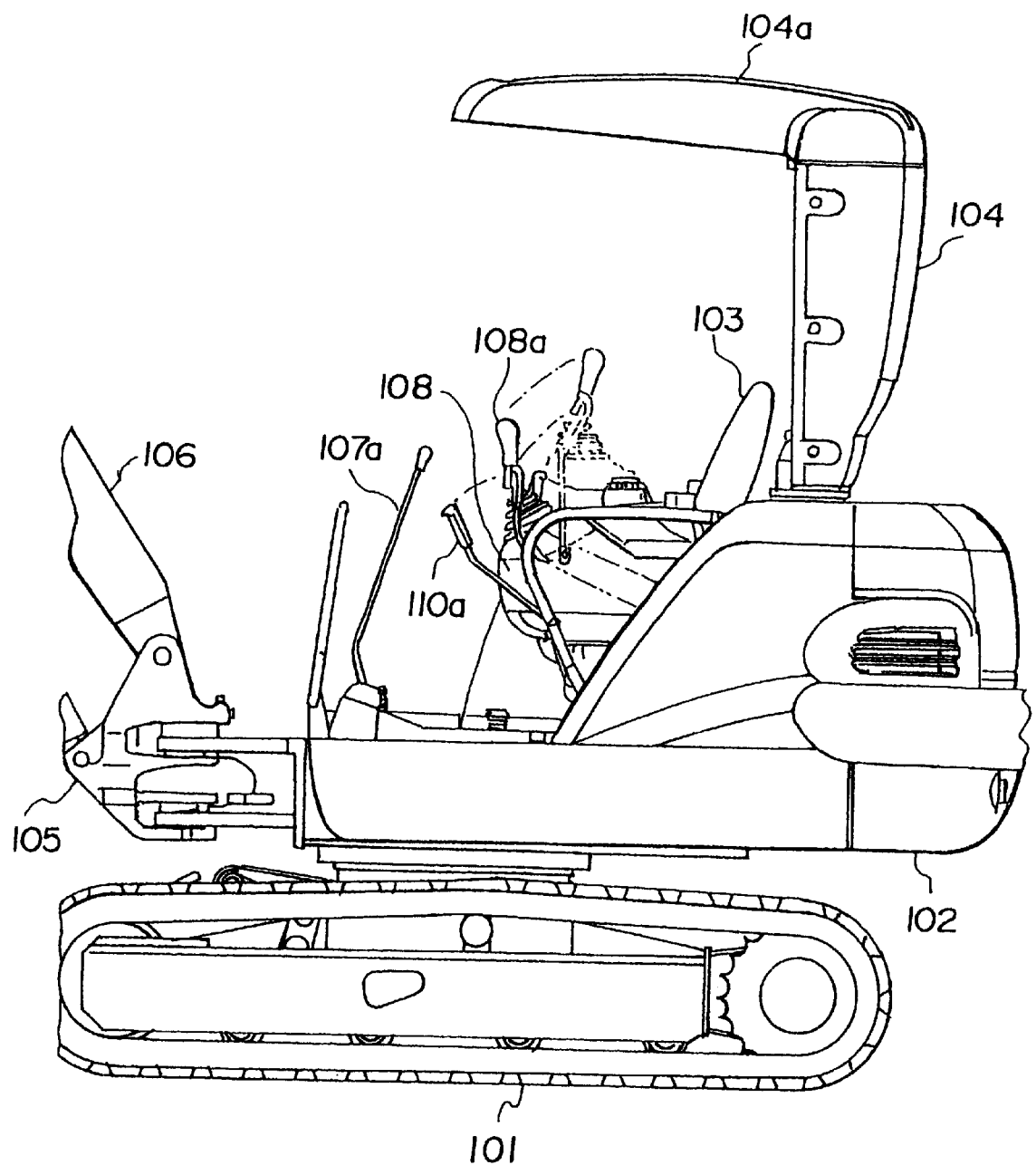
FIG. 4 is a side view of a mini power shovel equipped with the hydraulic system which includes the conventional hydraulic control valve.

FIG. 1 and FIG. 2 show the control valve 1 according to the present invention, actuators, for example, hydraulic cylinders 2,2' to be changed over under control by the control valve 1, and a hydraulic remote control valve 24 for changing over under control the control valve 1. The hydraulic remote control valve 24 is provided with four hydraulic pilot valves in this embodiment as in the conventional remote control valve 70 depicted in FIG. 3.

Inside a valve body 8 of the control valve 1 according to this embodiment, plural, for example, two internal bores are formed. Spools 4,4' are movably arranged within the respective internal bores. Movements of the respective spools 4,4' are effected by pilot pressures which are transmitted through pilot lines 24a,24b,24c,24d which connect the hydraulic remote control valve 24 and the control valve 1 with each other. These pilot lines 24a,24b,24c,24d are formed of pressure fluid hoses having flexibility, respectively. When the spool 4 moves, for example, rightward in FIGS. 1 and 2, fluid delivered from a variable displacement hydraulic pump 6 flows into a main line 5 so that the hydraulic cylinder 2 is caused to extend. When the spool 4 conversely moves leftward in the drawings, fluid delivered from the hydraulic pump 6 flows into a main line 7 so that the hydraulic cylinder 2 is caused to retract.

Now describing in further detail, the valve body 8 is provided with a pumped fluid passage 9 formed in a direction perpendicular to the respective spools 4,4', whereby pressure fluid delivered from the hydraulic pump 6 is supplied to the pumped fluid passage 9 through a pump port 10. The pressure fluid supplied to the pumped fluid passage 9 is guided to pump ports 11,12 and pump ports 11',12', which are arranged in pairs on left-hand and right-hand sides relative to approximate centers of the spools 4,4'. Further, two directional control ports 13,14 and two directional control ports 13' 14' are arranged on further outer sides of these pump ports 11,12 11', 12' as viewed in an axial direction. On further outer sides of these directional control ports 13,14 and directional control ports 13',14', two reservoir return ports 15,16 are arranged. Incidentally, numerals 17,18 in FIG. 2 indicate relief valves arranged on the sides of the directional control ports 13,14. The spool 4 is provided with small-diameter portions 19,20, which communicate the above-mentioned port 11 with port 13 and the above-mentioned port 13 with port 15 or the above-mentioned port 12 with port 14 and the above-mentioned port 14 with port 16. When the spool 4 moves rightwards in the drawings, the pump port 12 and the directional control port 14 are, therefore, brought into communication with each other through the small-diameter portion 20 of the spool 4. Concurrently with this, the directional control port 13 and the reservoir return port 15 are brought into communication with each other via the small-diameter portion 19 of the spool 4. In this manner, the pressure fluid from the hydraulic pump 6 is fed from the directional control port 14 through a connection port 22, which is shown in FIG. 2, and the main line 5 into the hydraulic cylinder 2 in a direction such that the hydraulic cylinder is caused to extend. On the other hand, the pressure fluid pushed out of the hydraulic cylinder 2 returns to a reservoir 23 through the line 7, a connection port 21 shown in FIG. 2 and the directional control port 13.and then through the return port 15. Description of the spool 4' is omitted herein as it has a similar construction as the spool 4.

When the spool 4 moves leftward in the drawings, on the other hand, the pump port 11 and the directional control port 13 are brought into communication with each other via the small-diameter portion 19 of the spool 4. Concurrently with this, the directional control port 14 and the reservoir return port 16 are brought into communication with each other via the small-diameter portion 20 of the spool 4. In this manner, the pressure fluid from the hydraulic pump 6 is fed from the directional control port 13 through the connection port 21, which is shown in FIG. 2, and the main line 7 into the hydraulic cylinder 2 in a direction such that the hydraulic cylinder is caused to retract. On the other hand, the pressure fluid pushed out of the hydraulic cylinder 2 returns to the reservoir 23 through the main line 5, the connection port 22 shown in FIG. 2 and the directional control port 14 and then through the return port 16.

Especially in this embodiment, one of the spool covers, that is, the spool cover 26 is internally provided with fluid passages 27,27', a shuttle valve 28 and a fluid passage 29. The fluid passages 27,27' are in communication with connection ports, i.e., pressure fluid ports 25,25' of the pilot lines 24a,24c connected to the hydraulic remote control valve 24. The shuttle valve 28 selects higher one of the pilot pressures transmitted to the fluid passages 27,27'. The fluid passage 29 transmits as a control pressure the pilot pressure outputted from the shuttle valve 28. Likewise, the other spool cover 32 is internally provided with fluid passages 33,33', a shuttle valve 34 and a fluid passage 35. The fluid passages 33,33, are in communication with connection ports, i.e., pressure fluid ports 31,31' of the pilot lines 24b,24d connected-to the hydraulic remote control valve 24. The shuttle valve 34 selects higher one of the pilot pressures transmitted to the fluid passages 33,33'. The fluid passage 35 transmits as a control pressure the pilot pressure outputted from the shuttle valve 34.

Arranged around the control valve 1 of this embodiment are a line 30 for transmitting the pilot pressure transmitted to the fluid passage 29, a line 36 for transmitting the pilot pressure transmitted to the fluid passage 35, a shuttle valve 37 for selecting higher one of the pressure transmitted to the line 30 and the pressure transmitted to the line 36, and a line 37a for supplying, to a delivery control device 37b which is a drive control device for the hydraulic pump 6, the pressure outputted from the shuttle valve 37.

A description will hereinafter be made about action of the control valve 1 of this embodiment constructed as described above.

When the hydraulic remote control valve 24 is controlled in one direction, a pilot pressure outputted from the hydraulic remote control valve 24 is supplied, for example, to the pressure fluid port 25, and the pilot pressure is applied to a right end face of the spool 4. As a result, the spool 4 moves leftward against biasing force of a coil spring 38 in FIGS. 1 and 2. Incidentally, when the hydraulic remote control valve 24 is controlled, for example, in another direction perpendicular to the above-mentioned direction and a pilot pressure outputted from the hydraulic remote control valve 24 is supplied to the pressure fluid port 25', the spool 4' moves likewise.

The pilot pressure supplied to the port 25 or port 25' is also supplied to the fluid passages 27,27' arranged inside the spool cover 26. Higher one of the pilot pressures supplied to these fluid passages 27,27' is selected at the shuttle valve 28, so that the pilot pressure on the higher pressure side is transmitted to the external line 30 via the oil passage 29. By controlling the hydraulic remote control valve 24 in a direction opposite to the above-mentioned one direction or in a direction opposite to the above-mentioned another direction, concerning these pilot pressures, the higher pilot pressure is also selected at the shuttle valve 34 arranged inside the spool cover 32 in a similar manner as described above. The thus-selected higher pilot pressure is transmitted to the external line 36 via the fluid passage 35. Incidentally, operation mechanisms for the spool 4,4' said operation mechanism being arranged inside the spool cover 32 and including the springs 38,38', correspond to the above-described pressure fluid control compartments 57a,57b,59a, 59b in FIG. 3.

Higher one of the pilot pressures transmitted to the line 30 and the line 36 is selected at the shuttle valve 37, and via the line 37a, the higher pilot pressure is supplied as a control pressure to a delivery control device 37b for the hydraulic pump 6. By the higher pilot pressure, the magnitude of a displacement in the hydraulic pump 6, in other words, a flow rate of fluid to be delivered from the hydraulic pump 6 is controlled.

The control valve 1 of this embodiment constructed as described above requires, as external lines connected to the hydraulic remote control valve 24, the lines 24a,24b,24c,24d directly associated with actuation of the spools 4,4', namely, only four external lines in total, and the lines 30,36,37a for transmitting a pilot pressure as a desired control pressure are only required to connect the control valve 1 with the delivery control device 37b for the hydraulic pump 6. Although the lines 30, 36 and 37a are arranged as external lines, they can be arranged at positions remote from the driver's seat in the construction machine and accordingly, the number of external lines connected to the hydraulic remote control valve 24 can be reduced.

Because the number of external lines, i.e., pressure fluid hoses connected to the hydraulic remote control valve 24 can be reduced as described above, the limitation imposed on the space for the arrangement of the hydraulic remote control valve 24 can be relaxed, thereby making it possible to provide a greater arrangement and design tolerance for the hydraulic remote control valve 24.

Further, the number of pressure fluid hoses connected to the hydraulic remote control valve 24 can be reduced as mentioned above. This makes it possible to reduce heating around the operator's seat by heat from these pressure fluid hoses, so that an environment in which an operator controls the hydraulic remote control valve 24 can be improved.

Even when the dimensions of the hydraulic remote control valve 24 are limited small to assure a sufficient space around the driver's seat, the above-mentioned possibility of reducing the number of pressure fluid hoses connected to the hydraulic remote control valve 24 facilitates the work to connect these pressure fluid hoses to the hydraulic remote control valve 24 and hence, can minimize an increase in assembly manhour.

Figure 5:
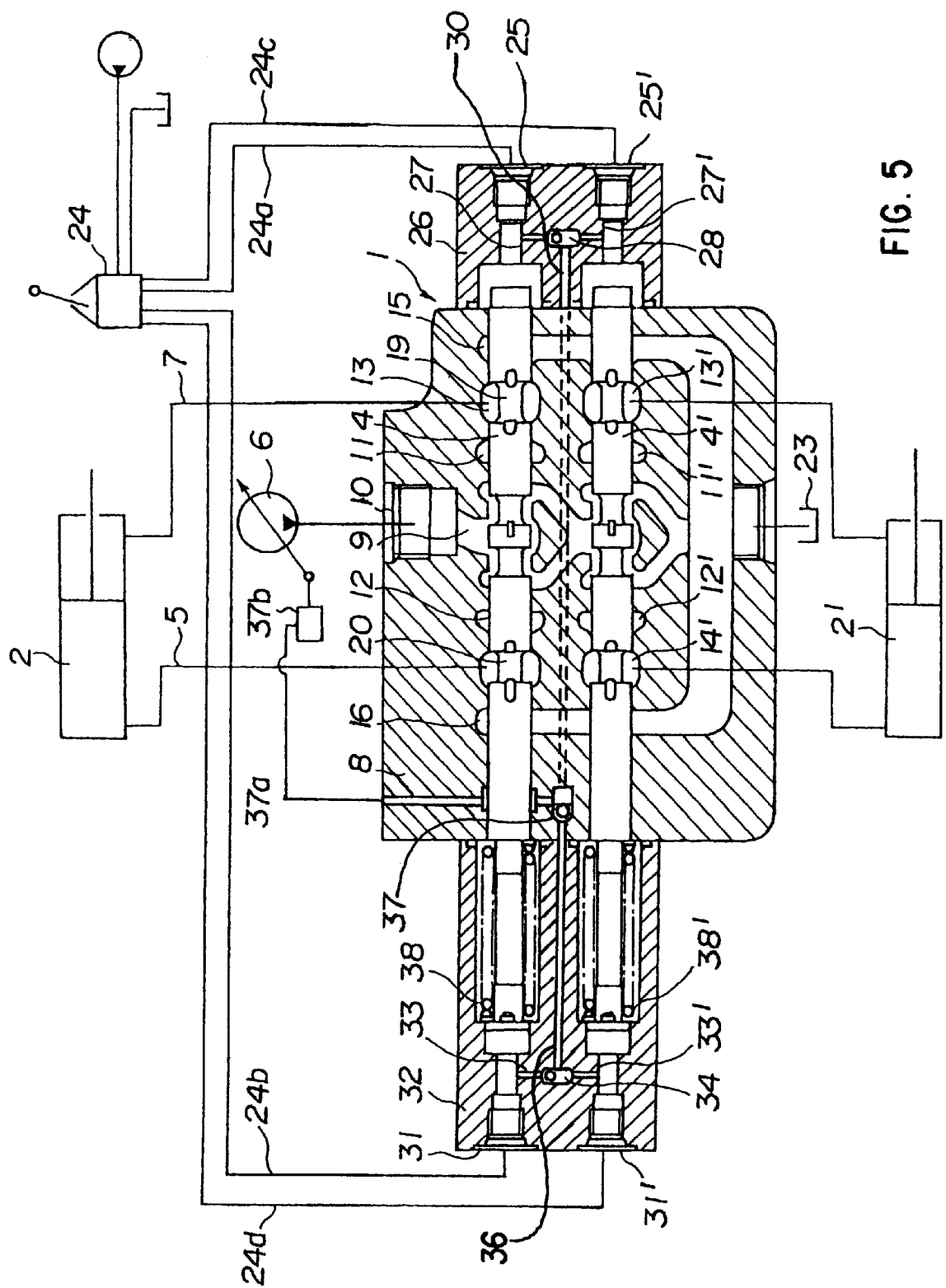
FIG. 5 is a circuit diagram showing a hydraulic system which includes another embodiment of the control valve according to the present invention.

In this embodiment, the lines 30,36 and the shuttle valve 37 are arranged outside the control valve 1. They may, however, be arranged in one of the valve covers 26,32 and valve body 8, which make up the control valve 1 as shown in FIG. 5.

A control valve constructed as mentioned above makes it possible especially to further reduce the number of external lines and also to obviate the connection ports for the fluid passages 29,35, at which these fluid passages are open to the outside in the above-mentioned embodiment depicted in FIGS. 1 and 2. It is, thus, sufficient to arrange only one connection port, that is, a connection port for the line 37a connected to the delivery control device 37b for the hydraulic pump 6. It is, therefore, possible to achieve a reduction in the number of lines around the control valve 1 and also, an improvement in the efficiency of line-connecting work.

In this embodiment, the shuttle valves 28,34 are arranged within the corresponding spool covers 26,32 disposed on opposite end portions of the valve body 8, respectively. Needless to say, this shuttling function may be arranged within only one of the spool covers.

CAPABILITY OF EXPLOITATION IN INDUSTRY

As has been described above, the present invention can reduce to a minimum the number of external lines, i.e., pressure fluid hoses connected to the hydraulic remote control valve. Compared with the conventional art, the limitation imposed on the space for the arrangement of the hydraulic remote control valve can be relaxed, thereby making it possible to provide a greater arrangement and design tolerance for the hydraulic remote control valve.

Since the number of external lines connected to the hydraulic remote control valve can be reduced to a minimum, it is possible to reduce heating around the operator's seat by heat from these external lines and hence, to make the working environment of the operator more comfortable.

Even when the dimensions of the hydraulic remote control valve are limited small to assure a sufficient space around the driver's seat, the possibility of reducing the number of external lines connected to the hydraulic remote control valve facilitates the work to connect these external lines to the hydraulic remote control valve and hence, permits a reduction in assembly manhour.

What is claimed is:

1. A control valve provided with a plurality of spools movably arranged within a valve body, movements of said spools being effected by pilot pressures, respectively, characterized in that:

a shuttle valve for selecting higher one of said pilot pressures, which cause said spools to move, respectively, is arranged within a main body of said control valve.

2. A control valve according to claim 1, wherein:

said main body of said control valve comprises said valve body and spool covers;

said valve body of said control valve is provided with a pump port, which is connected to a variable displacement hydraulic pump, and an actuator port connected to an actuator;

said spool covers are arranged on an longitudinal extension of said spools and on opposite sides of said valve body, respectively; and said shuttle valve is arranged on at least one of said spool covers.

3. A control valve according to claim 2, wherein one of said covers of said main body of said control valve is provided with a line which is a first pressure fluid port connected to a delivery control device for said variable displacement hydraulic pump.

4. A control valve according to claim 3, wherein said spool covers are each provided with two pressure fluid ports connected as second and third pressure fluid ports to a hydraulic remote control valve, and said shuttle valve is arranged between said second and third pressure fluid ports.

5. A control valve according to claim 4, wherein said second and third pressure fluid ports are arranged adjacent to each other.

6. A control valve according to claim 2, wherein a shuttle valve for transmitting a control pressure to said variable displacement hydraulic pump is arranged within said main body of said control valve.

* * * * *